(12) United States Patent
Nannen et al.

(10) Patent No.: US 11,012,017 B2
(45) Date of Patent: May 18, 2021

(54) METHOD FOR OPERATING A THREE-PHASE MACHINE

(71) Applicant: Siemens Aktiengesellschaft, Munich (DE)

(72) Inventors: Hauke Nannen, Nuremberg (DE); Heiko Zatocil, Nuremberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/574,142

(22) Filed: Sep. 18, 2019

(65) Prior Publication Data
US 2020/0106376 A1  Apr. 2, 2020

(30) Foreign Application Priority Data
Sep. 27, 2018  (EP) .................................. 18197208

(51) Int. Cl.
*H02P 21/10*  (2016.01)
*H02P 21/22*  (2016.01)
*H02K 21/46*  (2006.01)

(52) U.S. Cl.
CPC .............. *H02P 21/10* (2013.01); *H02P 21/22* (2016.02); *H02K 21/46* (2013.01); *H02P 2207/05* (2013.01)

(58) Field of Classification Search
CPC ........ H02P 21/22; H02P 2207/05; H02P 6/28; H02P 21/10; H02K 21/00; H02K 21/046
See application file for complete search history.

(56) References Cited

U.S. PATENT DOCUMENTS 3,348,110 A * 10/1967 Koppelmann .......... H02P 25/26
                                                        318/743
3,818,294 A    6/1974 Glukhov
(Continued)

FOREIGN PATENT DOCUMENTS

DE        10003692 A1    8/2001
EP        2061144 A1     5/2009
(Continued)

OTHER PUBLICATIONS

Benecke Marcel: "Anlauf von energieeffizienten Synchronmaschinen mit Drehstromsteller", XP055392434, Gefunden im Internet: URL:http://d-nb.info/1054135258/34, [gefunden am Jul. 20, 2017], the whole document; 2012.

*Primary Examiner* — Thai T Dinh
(74) *Attorney, Agent, or Firm* — Harness, Dickey & Pierce, P.L.C.

(57) ABSTRACT

An embodiment relates to a method for operating a three-phase machine including a rotor and a stator connected to a three-phase network. The stator is connected to the three-phase network via a first semiconductor circuit arrangement for forming a first rotational field rotating in a first direction of rotation in the stator and via a second semiconductor circuit arrangement for forming a second rotational field rotating in a direction of rotation opposite to the first direction of rotation in the stator. The three-phase machine further includes a controller. The method includes controlling, via the controller, semiconductors of the first and second semiconductor circuit arrangement to accelerate the rotor by current pulses of both the first rotational field and second rotational field in the first direction of rotation.

14 Claims, 5 Drawing Sheets

(56) References Cited

U.S. PATENT DOCUMENTS

| | | | | |
|---|---|---|---|---|
| 4,461,985 A * | 7/1984 | Stitt | ........................ | H02P 27/02 |
| | | | | 318/727 |
| 4,996,469 A * | 2/1991 | DeLange | ................... | H02P 1/28 |
| | | | | 318/757 |
| 5,008,608 A * | 4/1991 | Unsworth | ............... | H02P 27/02 |
| | | | | 318/729 |
| 5,151,642 A * | 9/1992 | Lombardi | ................. | H02P 1/28 |
| | | | | 318/779 |
| 6,870,333 B2 * | 3/2005 | Griepentrog | ............ | H02P 27/18 |
| | | | | 318/257 |
| 8,179,082 B2 * | 5/2012 | Li | ............................ | H02P 1/30 |
| | | | | 318/778 |
| 8,390,238 B2 * | 3/2013 | Ek | .......................... | H02M 1/34 |
| | | | | 318/778 |
| 9,083,276 B2 * | 7/2015 | Yamada | ................. | H02K 19/12 |
| 2009/0267552 A1 | 10/2009 | Li et al. | | |

FOREIGN PATENT DOCUMENTS

| | | |
|---|---|---|
| WO | WO 0156143 A1 | 8/2001 |
| WO | WO 2018/072810 | 4/2018 |
| WO | WO 2018/086688 | 5/2018 |

* cited by examiner

METHOD FOR OPERATING A THREE-PHASE MACHINE

PRIORITY STATEMENT

The present application hereby claims priority under 35 U.S.C. § 119 to European patent application number EP 18197208.4 filed Sep. 27, 2018, the entire contents of which are hereby incorporated herein by reference.

FIELD

Embodiments of the invention generally relate to a method for operating a three-phase machine, a corresponding computer program product, a three-phase controller and a drive system having such a three-phase controller.

BACKGROUND

A three-phase machine can in principle be operated as an electric generator or as an electric motor. The former converts mechanical energy into three-phase current, the latter three-phase current into mechanical energy. Three-phase motors are classified according to IEC standard 60034 in terms of their efficiency into various efficiency classes IE 1 to IE 4 (IEC=International Electrotechnical Commission; IE=International Efficiency). Not all defined efficiencies for electric motors can be easily maintained using the asynchronous machine, especially in the lower power range up to 20 kW, which is why the use of permanent magnets in the rotor is increasingly sought, for example, as a permanent-magnet synchronous machine (=PMSM).

Figure 1:
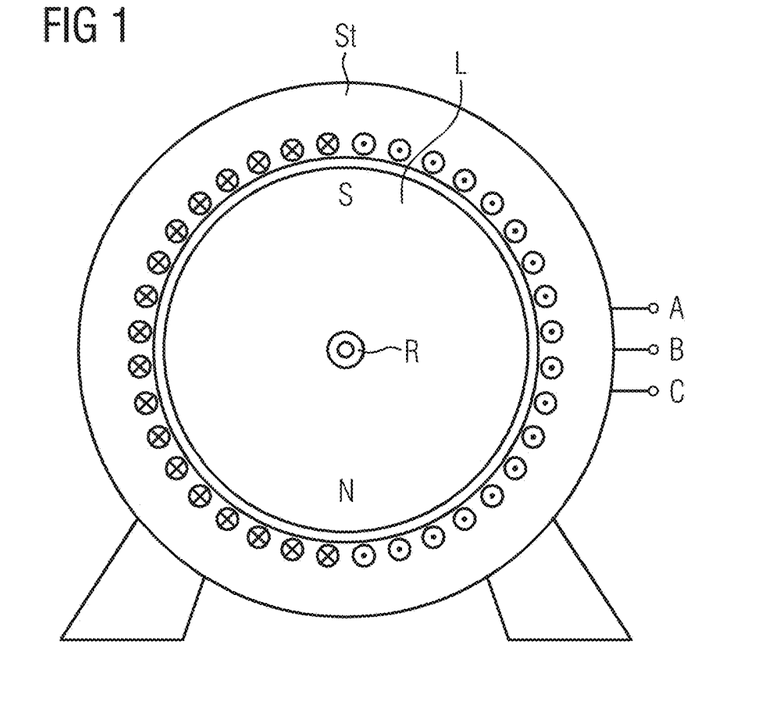

FIG. 1 shows a schematic representation of such a permanent-magnet synchronous machine in an embodiment as a revolving field machine having a stator St which comprises stator windings having winding strands for the three phases of a three-phase network. In this case, the stator windings are electrically connectable to the three phases of the three-phase network via phase terminals A, B, C. The synchronous machine also has a rotor L (also called an armature or pole wheel) in the interior of the stator St, which rotor comprises a magnetic north pole N and a magnetic south pole S and is mounted rotatably about a rotation axis R. The illustration in FIG. 1 is to be understood as merely example and has no limiting effect on the scope of protection the claimed subject matter. If the three-phase current in the stator windings passes through a full time period, the magnetic field of the stator St continues to rotate one full pole pitch (one north and one south pole). With two pairs of poles in the stator, this corresponds to a mechanical rotation of 180 degrees. Since magnetic poles can only occur in pairs, the smallest pole pair number is p=1 (a north pole and a south pole). The number of poles is adequately 2 p. A 4-pole machine thus has 2 pole pairs, that is, the pole pair number p=2. The rotational speed of the stator field in a motor having two pole pairs is only half of that in a motor having only one pole pair, although the frequency of the feeding current does not change. The pole pair number p of the motor, motors commonly having one to four pole pairs, thus determines the rotational frequency of the stator field and thus the rotational speed or rotational frequency of the rotor, which follows the magnetic field in the stator. The rotation frequency of the rotor decreases with increasing pole pair number.

Although the machine type PMSM enables high energy efficiency, the start and operation on the rigid network are not easily possible. To enable this, a damper cage can be provided in the rotor of the machine. Although the damper cage enables a safe startup on the rigid network, the combination of the flows of damper cage and permanent magnet leads to high starting currents.

Likewise, operation on a suitable power electronic actuator, such as a frequency converter (=FU) or soft starter, is possible. In particular, the use of a soft starter, represents a cost-effective solution for starting up a PMSM on a "rigid network", that is, on a three-phase network using a fixed network frequency. Measures to limit the power when switching on an electrical device, for example, an electric motor, are referred to as a soft start. In conventional soft starters for asynchronous machines, the electrical voltage applied to the motor is reduced when the motor is switched on and slowly increased to the full network voltage, for example, via phase angle control. However, this method is not suitable for starting PMSM.

The dissertation of Dr. Marcel Benecke, University of Magdeburg, 2012, entitled "Anlauf von energieeffizienten Synchronmaschinen mit Drehstromsteller" presents a solution for starting up the permanent-magnet synchronous machine on a soft starter. The method presented in this work, however, requires the current polar wheel angle of the machine, so that the motors used for this work had to be equipped with a corresponding encoder system. An encoder is understood as meaning rotational speed and position encoders which detect the mechanical variables rotational speed and position of the pole wheel, that is, of the rotor. Their signals are required to supply the controllers with actual values and to close the existing rotational speed and position control loops. The rotational speed and position signals also serve as an important input variable for the current control loop for the vectorial control methods in three-phase drives. In this case, the encoder detects the rotational speed and/or position directly on the motor shaft.

The encoder system negatively affects the cost and availability of the system, which currently makes a soft starter solution unattractive for highly efficient motors. For these reasons, a method for starting up without an encoder is preferred.

A method for starting up without encoder is known, for example, from WO2018/086688A1 (Siemens AG) May 17, 2018. In this case, the rotor is rotated from a known initial position with a maximum torque via ignition of thyristors, a voltage induced by the rotation of the rotor is measured, and an optimum ignition angle of the synchronous machine is determined. This method enables the machine to start without a rotary encoder system, but provides for a pre-start orientation of the rotor. Such a method without encoder for aligning a three-phase machine is described in WO2018/072810A1 (Siemens AG) Apr. 26, 2018.

The difference between the electrical network rotational speed, corresponding to a grid frequency of the three-phase network of usually 50 Hz or 60 Hz, and the motor rotational speed decreases with increasing motor rotational speed. This has the consequence of the difference angle $\Delta\_\varphi$ between the electrical network angle $\varphi\_grid$ and the motor angle $\varphi\_mech$ also changing slowly.

Figure 2:
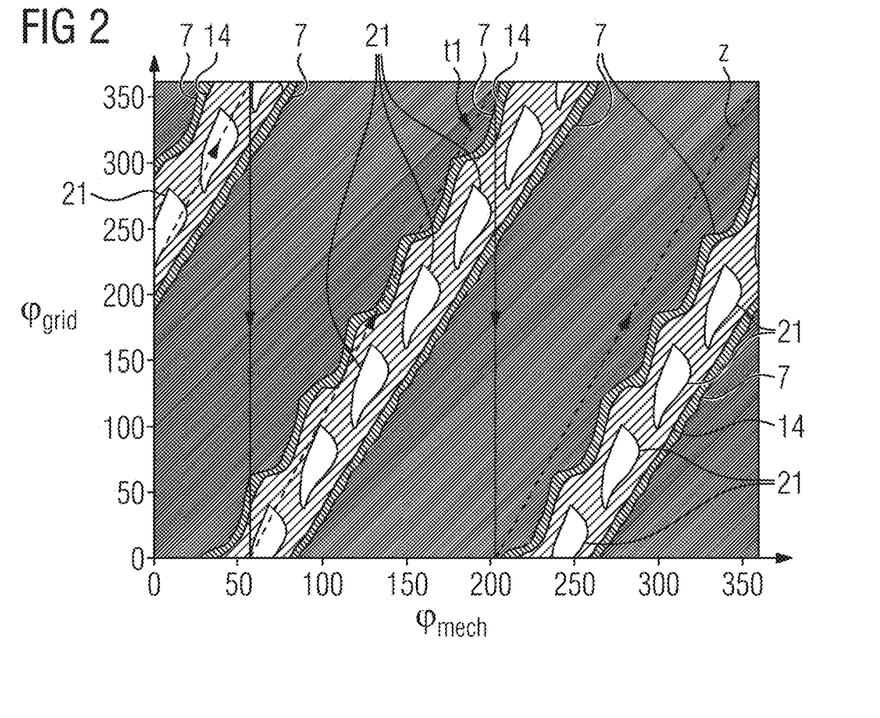
FIG. 2 a contour diagram of the maximum possible mean torque M_mean as a function of the network angle φ_grid and the motor angle φ_mech with a conventional soft starter arrangement, as illustrated, for example, in FIG. 7.

FIG. 2 shows a contour diagram of the maximum possible mean torque M_mean, in the following also referred to simply as the mean torque M_mean, as a function of the network angle $\varphi\_grid$ and the motor angle $\varphi\_mech$ when selecting the optimum ignition time of the thyristors, which is determined by the algorithm of the Benecke method which is described in the above-mentioned dissertation by Dr. Benecke. The illustration in FIG. 2 relates to an example motor having a pole pair number of p=2. The motor has reached its maximum rotational speed at an motor rotational speed of 25 rps=1500 rpm, and the rotor is running synchronously with the network. Isolines are shown at the values 7, 14 and 21 Nm. The darkest regions shown in FIG. 2, also referred to as "torque valleys", in which the mean torque M_mean is less than 7 Nm, are less useful for an acceleration of the motor, since a small positive torque is achievable here; they also include those regions in which the torque M_mean is negative or the current would be greater than a predetermined current limit, that is, where an ignition of the thyristors definitely makes no sense. A current limit, which defines a maximum permissible current, is used for energy efficiency and protection of the electrical components.

The regions shown in white in FIG. 2, also referred to as "torque peaks", in which the mean torque M_mean is greater than 21 Nm, are optimally suited for an ignition of the thyristors in order to accelerate the motor effectively: the possible torque is at maximum in the white regions. The regions lying between them, that is, the light gray regions between 7 and 14 Nm and the even lighter regions between 14 and 21 Nm, are such that they are better suited for an acceleration of the motor, the greater the mean torque M_mean achievable therein.

The time course of network and motor angle during startup of the motor is illustrated in FIG. 2 as a dotted line Z; the time course is illustrated by the arrows on the dotted line Z. This is merely a schematic representation of a time segment which disregards deformations of the dotted line Z through acceleration processes in order to explain the relationships as clearly as possible. If the dotted line Z reaches the maximum value 360 degrees on the scale of the electrical network angle φ_grid, the course is continued at the minimum value 0 degrees on the scale of the electrical network angle φ_grid: this is indicated by the two vertically downward pointing arrows in FIG. 2. As long as the rotational speed of the rotor is just below the synchronous rotational speed, here: 1500 rpm, the network and motor angle, as illustrated by the dotted line Z in the range of the motor angle φ_mech=0 to about 130°, runs in the isolines of 14 and larger. A positive torque contribution can be achieved on a sustained basis here by ignitions. With further increasing rotor rotational speed, however, the line Z, starting from motor angles of φ_mech=approximately 130°, slowly moves into a region in which positive torque can no longer be achieved. The rotational speed drops again here. t1 marks the beginning of the phase in which positive torque can no longer be achieved.

This situation has the consequence that the soft starter, at motor rotational speeds close to the synchronous network rotational speed, here: 1500 rpm, finds fewer and fewer possibilities for the ignition of the thyristors and inserts ever longer breaks between pulse blocks. During this time, the system is in a "torque valley" of FIG. 2, and the ignition algorithm waits until it encounters a "torque peak" of FIG. 2 again.

Figure 3:
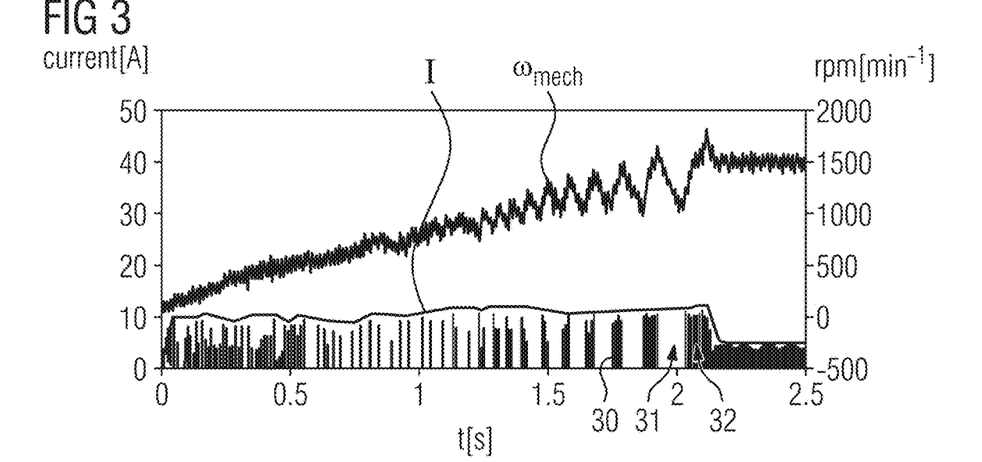
FIG. 3 an I-t- and ω_mech-t diagram for a conventional startup of a PMSM.

FIG. 3 shows a diagram describing the startup of a PMSM with a current strength-time curve and a ω_mech-time curve, wherein the magnitude of the current I of the stator phases is plotted in the unit amperes and the mechanical angular speed ω_mech of the rotor is plotted in the unit min-1 over time in units of seconds. In addition, the ignition times 30 of the thyristors are indicated on the x-axis, which, if they take place in quick succession, form so-called pulse blocks 32. In the time range between t=1.5 s and t=2 s, it can be seen that pulse blocks 32 formed by a cluster of ignition times of the thyristors cause a significant acceleration of the rotor, that is, an increase of the mechanical angular speed ω_mech. The pulse blocks 32, that is, a clustered ignition of thyristors to generate a positive torque, correlate with a torque peak in FIG. 2. Analogously to this, a pulse pause 31, that is, a lack of a pulse block 32, correlates with a torque valley in FIG. 2.

The pulse pauses 31 between the pulse blocks 32, which become ever longer at motor rotational speeds close to the synchronous network rotational speed, lead to a so-called "rotary speed ripple" during startup of a motor on a soft starter, that is, a ripple of the mechanical rotational speed ω_mech, which is clearly visible in the time range in FIG. 3 between t=1.5 s and t=2 s.

SUMMARY

At least one embodiment of the invention provides an improved method for operating a three-phase machine, in particular a permanent-magnet synchronous machine.

At least one embodiment is directed to a method which is suitable for operating a permanent-magnet synchronous machine. The method can also be used in other three-phase machines, for example, a synchronous machine having an electrically excited rotor, or an asynchronous machine. The synchronous machine has a rotor. The synchronous machine has a stator which has a three-phase stator winding and is connected to a three-phase network.

In at least one embodiment, the phases of the three-phase network are conductively connected to the stator windings. The stator is connected to the three-phase network via a first semiconductor circuit arrangement, preferably a first thyristor circuit arrangement, such that a first rotational field rotating in a first direction of rotation can be generated in the stator. And the stator is connected via a second semiconductor circuit arrangement, preferably a second thyristor circuit arrangement, to the three-phase network such that a second rotational field rotating in a direction of rotation opposite to the first direction of rotation can be generated in the stator. In this case, the synchronous machine also has a control unit, which serves to set the semiconductors, preferably for igniting the thyristors, of the first and the second semiconductor circuit arrangement.

According to at least one embodiment of the invention, the control unit sets the semiconductors, preferably switching of thyristors, in such a way that the rotor is accelerated by current pulses of both the first and the second rotational field in the first direction of rotation. In this case, additional time points for setting the semiconductors, preferably for igniting the thyristors, are available through the second rotational field in which the rotor can be accelerated in the first direction of rotation.

The outlined task is also achieved by a computer program product according to at least one embodiment of the invention. The computer program product is designed to be executable in a control unit. The computer program product can be storable as software or firmware in a memory and designed to be executable by an arithmetic unit. Alternatively or additionally, the computer program product can also be designed at least partially as a hard-wired circuit, for example as an ASIC (=application-specific integrated circuit). The computer program product is designed to receive and evaluate measured values, and to generate commands to components of a motor control device, in particular a soft starter.

According to at least one embodiment of the invention, the computer program product is designed to implement and perform at least one embodiment of the method outlined for operating a three-phase machine, in particular a permanent-magnet synchronous machine. In this case, the computer program product can combine all the sub-functions of the method, that is, be designed monolithically. Alternatively, the computer program product can also be designed segmented and respectively distribute sub-functions to segments that are executed on separate hardware. For example, a part of the parameter determination method can be performed in a soft starter and another part of the parameter determination method in a higher-level control unit, such as a PLC (=programmable logic controller), a manual parameterization device, or a computer cloud.

Another embodiment of the invention is directed to a three-phase controller for operating a three-phase machine, in particular a permanent-magnet synchronous machine, having three contacts for connection to the phases of a three-phase network; three contacts for connection to the stator windings of the three-phase machine; a first semiconductor circuit arrangement for forming a first rotational field rotating in a first direction of rotation in a stator of the three-phase machine; a second semiconductor circuit arrangement for forming a second rotational field rotating in a direction of rotation opposite to the first direction of rotation in the stator of the three-phase machine; and a control unit for controlling the first and second semiconductor circuit arrangement, which is configured to perform at least one embodiment of the method described above.

Another embodiment of the invention is a drive system comprising a three-phase machine, in particular a PMSM, having a stator having a stator winding and a rotor.

The three-phase machine comprises at least one first voltage measuring device for detecting at least two network voltages of a three-phase network provided for driving the three-phase machine. The three-phase machine comprises at least one second voltage measuring device for detecting at least two terminal voltages of the three-phase machine. And the three-phase machine comprises at least one current measuring device for detecting at least two stator phase currents of the three-phase machine. In addition, the three-phase machine comprises a three-phase controller for operating the three-phase machine. The three-phase controller has three contacts for connection to the three phases of a three-phase network, three contacts for connection to the stator windings of the three-phase machine, a first semiconductor circuit arrangement for forming a first rotational field rotating in a first direction of rotation in a stator of the three-phase machine, a second semiconductor circuit arrangement for forming a second rotational field rotating in a direction of rotation opposite to the first direction of rotation in the stator of the three-phase machine, and a control unit for controlling the first and second semiconductor circuit arrangement. The control unit is configured to perform the method of at least one embodiment described above.

At least one embodiment is directed to a method for operating a three-phase machine including a rotor and a stator, connected to a three-phase network including a three-phase stator winding, the stator being connected to the three-phase network via a first semiconductor circuit arrangement for forming a first rotational field rotating in a first direction of rotation in the stator and via a second semiconductor circuit arrangement for forming a second rotational field rotating in a direction of rotation opposite to the first direction of rotation in the stator, the three-phase machine further including a controller for setting the semiconductors of the first and second semiconductor circuit arrangement, the method comprising:

controlling, via the controller, semiconductors of the first semiconductor circuit arrangement and semiconductors of the second semiconductor circuit arrangement to accelerate the rotor by current pulses of both the first rotational field and the second rotational field in the first direction of rotation, the second rotating field providing additional times for setting the semiconductors, in which the rotor is acceleratable in the first direction of rotation.

At least one embodiment is directed to a three-phase controller for operating a three-phase machine including a rotor and a stator, comprising:
  three contacts for respective connection to three respective phases of a three-phase network;
  three contacts for connection to stator windings of the three-phase machine;
  a first semiconductor circuit arrangement for forming a first rotational field rotating in a first direction of rotation in the stator of the three-phase machine;
  a second semiconductor circuit arrangement for forming a second rotational field rotating in a direction of rotation opposite to the first direction of rotation in the stator of the three-phase machine; and
  a controller for controlling the first semiconductor circuit arrangement and the second semiconductor circuit arrangement, to accelerate the rotor of the three-phase machine by current pulses of both the first rotational field and the second rotational field in the first direction of rotation, the second rotating field providing additional times for setting the semiconductors, in which the rotor is acceleratable in the first direction of rotation.

At least one embodiment is directed to a drive system, comprising
  the three-phase machine, including the stator having the stator winding and the rotor;
  at least one first voltage measuring device for detecting at least two network voltages of a three-phase network provided for driving the three-phase machine;
  at least one second voltage measuring device for detecting at least two terminal voltages of the three-phase machine; and
  at least one current measuring device for detecting at least two stator phase currents of the three-phase machine; and
  the three-phase controller of an embodiment.

A non-transitory computer readable medium storing a computer program that, when executed by a processor, is configured to perform the method of an embodiment.

BRIEF DESCRIPTION OF THE DRAWINGS

In the following, the invention is explained with reference to several example embodiments with the aid of the accompanying drawings. In each case shown schematically and not to scale FIG. 1 a section through an example three-phase machine.

DETAILED DESCRIPTION OF THE EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

At least one embodiment is directed to a method which is suitable for operating a permanent-magnet synchronous machine. The method can also be used in other three-phase machines, for example, a synchronous machine having an electrically excited rotor, or an asynchronous machine. The synchronous machine has a rotor. The synchronous machine has a stator which has a three-phase stator winding and is connected to a three-phase network.

In this case, the phases of the three-phase network are conductively connected to the stator windings. The stator is connected to the three-phase network via a first semiconductor circuit arrangement, preferably a first thyristor circuit arrangement, such that a first rotational field rotating in a first direction of rotation can be generated in the stator. And the stator is connected via a second semiconductor circuit arrangement, preferably a second thyristor circuit arrangement, to the three-phase network such that a second rotational field rotating in a direction of rotation opposite to the first direction of rotation can be generated in the stator. In this case, the synchronous machine also has a control unit, which serves to set the semiconductors, preferably for igniting the thyristors, of the first and the second semiconductor circuit arrangement.

The setting of semiconductors comprises the electrical switching of a semiconductor, for example, a transistor, a thyristor or a triac such that the semiconductor conducts current (conductive state) or does not conduct current (blocking state). A particularly preferred embodiment of the setting of a semiconductor is the switching of a thyristor: during the switch-on process, the so-called "ignition", for example, by ignition pulses of a control current, the thyristor goes from the blocking state to the conductive state; the switch-off process, that is, the transition of the thyristor from the conductive to the blocking state, for example, takes place by blocking the control current—the current through the thyristor then flows up to its natural zero crossing, where it ceases to exist.

According to at least one embodiment of the invention, the control unit sets the semiconductors, preferably switching of thyristors, in such a way that the rotor is accelerated by current pulses of both the first and the second rotational field in the first direction of rotation. In this case, additional time points for setting the semiconductors, preferably for igniting the thyristors, are available through the second rotational field in which the rotor can be accelerated in the first direction of rotation.

To determine a suitable ignition time of the semiconductors, a current polar wheel angle, that is, the orientation angle of the rotor, a current rotor rotational speed $\omega\_mech$, for example derived from the orientation angle of the rotor, a current network phase position of the three-phase network, that is, the network voltage phase position in at least one of the phases of the three-phase network, and the current stator phase currents are repeatedly determined. Using the current polar wheel angle, the current rotor rotational speed, the current network phase position and the current stator phase currents, the control unit pre-calculates a torque curve of a torque acting on the rotor in each case in one ignition period for all possible ignition events, and, using the pre-calculated torque curves for each thyristor pair, decides whether it is ignited. The determination of the ignition times is based on the rotor orientation angle and the network voltage phase position such that a positive torque is generated.

At least one embodiment of the invention is based on the knowledge that, in order to accelerate the rotor of an electric machine, additional times for igniting the thyristors are available to a soft starter, when not only a first rotating three-phase network, but additionally also a counter-rotating three-phase network are applied to the stator of the machine. In the case of a topology changed in such a way that not only a rotational field rotating in a first direction, but also a counter-rotating second rotational field is applied to the machine, the course of FIG. 2 thus changes such that the algorithm running in the control unit now has further ignition options, with which the rotor can be accelerated. The "torque valleys" of the system given by the first rotational field can be compensated by the second rotational field, that is, be interrupted by ignitions of the thyristors, which lead to additional torque pulses to the rotor, and thus pulse pauses at rotational speeds close to the synchronous rotational speed can be avoided or at least regularly interrupted.

For example, two phases of the three-phase network can selectively be exchanged with each other and thus a counter-rotating rotational field can be applied to the three-phase machine. Other circuitry having a similar effect is also conceivable here: In order to reduce the number of additionally required thyristors, it is conceivable, in addition to a 3-phase topology, to transfer the new topology to devices having only two switchable phases. As a result, only a further anti-parallel thyristor pair is needed in comparison to the known three-phase semiconductor switch of a soft starter.

Advantageous embodiments and further developments of the invention are specified in the claims.

According to a preferred embodiment of the invention, only two phases of the three-phase network are settable by the first and second semiconductor circuit arrangement. Due to the saving of semiconductor switches, in particular thyristors, on the third phase, this 2-phase variant, with respect to the 3-phase variant, represents a more cost-effective variant, in which each of the three phases can be set by semiconductor switches.

According to a preferred embodiment of the invention, the three-phase machine is a permanent-magnet synchronous machine.

According to a preferred embodiment of the invention, the three-phase machine is a permanent-magnet synchronous machine having a damper cage. A damper cage brings an asynchronous component into a synchronous machine with the advantage of a general improvement of the startup. Specifically, the damper cage leads to a damping in the system for a PMSM operated using a soft starter, since the flow that can be thus generated is not as rigid as with a permanent magnet.

According to a preferred embodiment of the invention, the three-phase controller comprises a device for determining the rotational speed of the rotor of the synchronous machine, a device for determining the phase position of the three-phase network and/or a device for determining at least a part of the stator currents.

According to a preferred embodiment of the invention, the control device is configured to pre-calculate a torque curve for the synchronous machine from the determined values for a definable period of time when connecting at least a part of the semiconductor plate and to determine a switching time based on the pre-calculation, at which time semiconductors of the semiconductor circuit arrangements are conductively connected (thyristor ignition time).

The outlined task is also achieved by a computer program product according to at least one embodiment of the invention. The computer program product is designed to be executable in a control unit. The computer program product can be storable as software or firmware in a memory and designed to be executable by an arithmetic unit. Alternatively or additionally, the computer program product can also be designed at least partially as a hard-wired circuit, for example as an ASIC (=application-specific integrated circuit). The computer program product is designed to receive and evaluate measured values, and to generate commands to components of a motor control device, in particular a soft starter.

According to at least one embodiment of the invention, the computer program product is designed to implement and perform at least one embodiment of the method outlined for operating a three-phase machine, in particular a permanent-magnet synchronous machine. In this case, the computer program product can combine all the sub-functions of the method, that is, be designed monolithically. Alternatively, the computer program product can also be designed segmented and respectively distribute sub-functions to segments that are executed on separate hardware. For example, a part of the parameter determination method can be performed in a soft starter and another part of the parameter determination method in a higher-level control unit, such as a PLC (=programmable logic controller), a manual parameterization device, or a computer cloud.

Another embodiment of the invention is directed to a three-phase controller for operating a three-phase machine, in particular a permanent-magnet synchronous machine, having three contacts for connection to the phases of a three-phase network; three contacts for connection to the stator windings of the three-phase machine; a first semiconductor circuit arrangement for forming a first rotational field rotating in a first direction of rotation in a stator of the three-phase machine; a second semiconductor circuit arrangement for forming a second rotational field rotating in a direction of rotation opposite to the first direction of rotation in the stator of the three-phase machine; and a control unit for controlling the first and second semiconductor circuit arrangement, which is configured to perform at least one embodiment of the method described above.

According to a preferred embodiment of the invention, the control unit is a microprocessor.

Another embodiment of the invention is a drive system comprising a three-phase machine, in particular a PMSM, having a stator having a stator winding and a rotor.

The three-phase machine comprises at least one first voltage measuring device for detecting at least two network voltages of a three-phase network provided for driving the three-phase machine. The three-phase machine comprises at least one second voltage measuring device for detecting at least two terminal voltages of the three-phase machine. And the three-phase machine comprises at least one current measuring device for detecting at least two stator phase currents of the three-phase machine. In addition, the three-phase machine comprises a three-phase controller for operating the three-phase machine. The three-phase controller has three contacts for connection to the three phases of a three-phase network, three contacts for connection to the stator windings of the three-phase machine, a first semiconductor circuit arrangement for forming a first rotational field rotating in a first direction of rotation in a stator of the three-phase machine, a second semiconductor circuit arrangement for forming a second rotational field rotating in a direction of rotation opposite to the first direction of rotation in the stator of the three-phase machine, and a control unit for controlling the first and second semiconductor circuit arrangement. The control unit is configured to perform the method of at least one embodiment described above.

Figure 4:
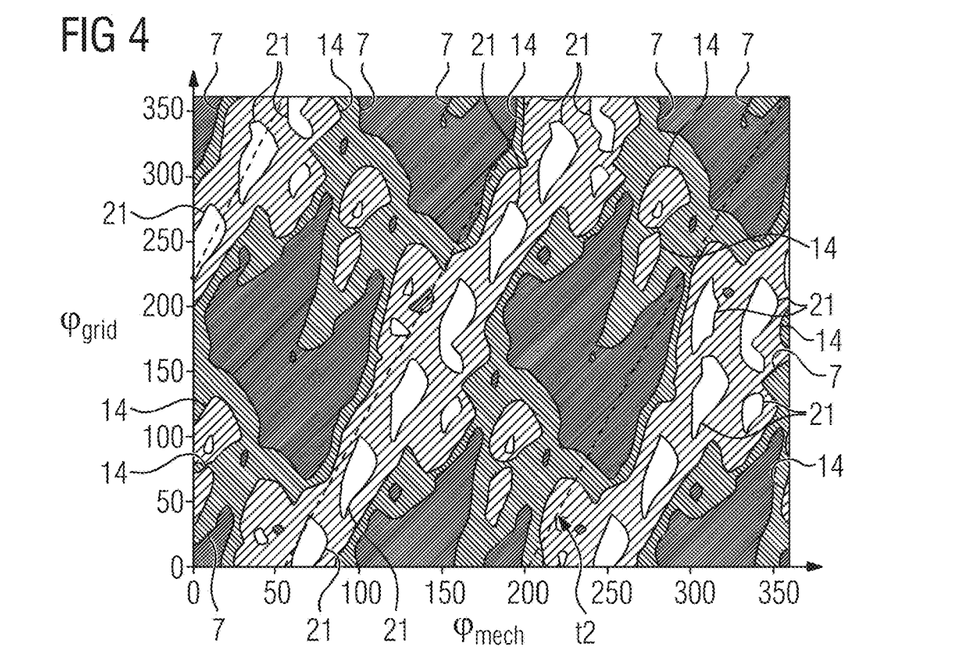
FIG. 4 a contour diagram of the maximum possible mean torque M_mean as a function of the network angle φ_grid and the motor angle φ_mech with a soft starter arrangement enhanced according to the invention, as illustrated, for example, in FIGS. 5 and 6.

FIG. 4 shows a torque curve which is possible with the present invention as a contour diagram of the maximum possible mean torque M_mean as a function of the network angle φ_grid of the three-phase network and the motor angle φ_mech of the three-phase machine when the optimum ignition time of the thyristors is selected. The contour diagram illustrated in FIG. 4 can be read in the same way as the contour diagram illustrated in FIG. 2. For reasons of clarity, FIG. 4 omits the arrows indicating the time course, which are drawn in FIG. 2.

In order to be able to bridge over the pulse gaps 31 in FIG. 3, a topology adaptation is carried out according to the invention. This makes it possible to also create a rotational field opposite to the direction of rotation of the motor in the stator. It is clear from FIG. 4 that by the second rotational field rotating in a direction of rotation opposite to the first direction of rotation in the stator, the "torque valleys" are partially compensated by newly added "torque peaks" transverse thereto. Accordingly, the areas in which positive torque can be generated complement each other, and there are no longer long periods of time in which no ignition is possible. Although continuous ignition is not possible, as is the case in the first angle section having φ_mech=0 to 50 degrees, there are always times in which a positive torque is available to support the rotational speed. t2 is an example of a time point in which a positive torque is possible due to the added counter-rotating rotational field. Since these added torque peaks, which are generated by the counter-rotating rotational field, result in positive torques, the motor can be further accelerated by them—the pulse gaps 31 shown in FIG. 3 thereby virtually disappear.

Figure 5:
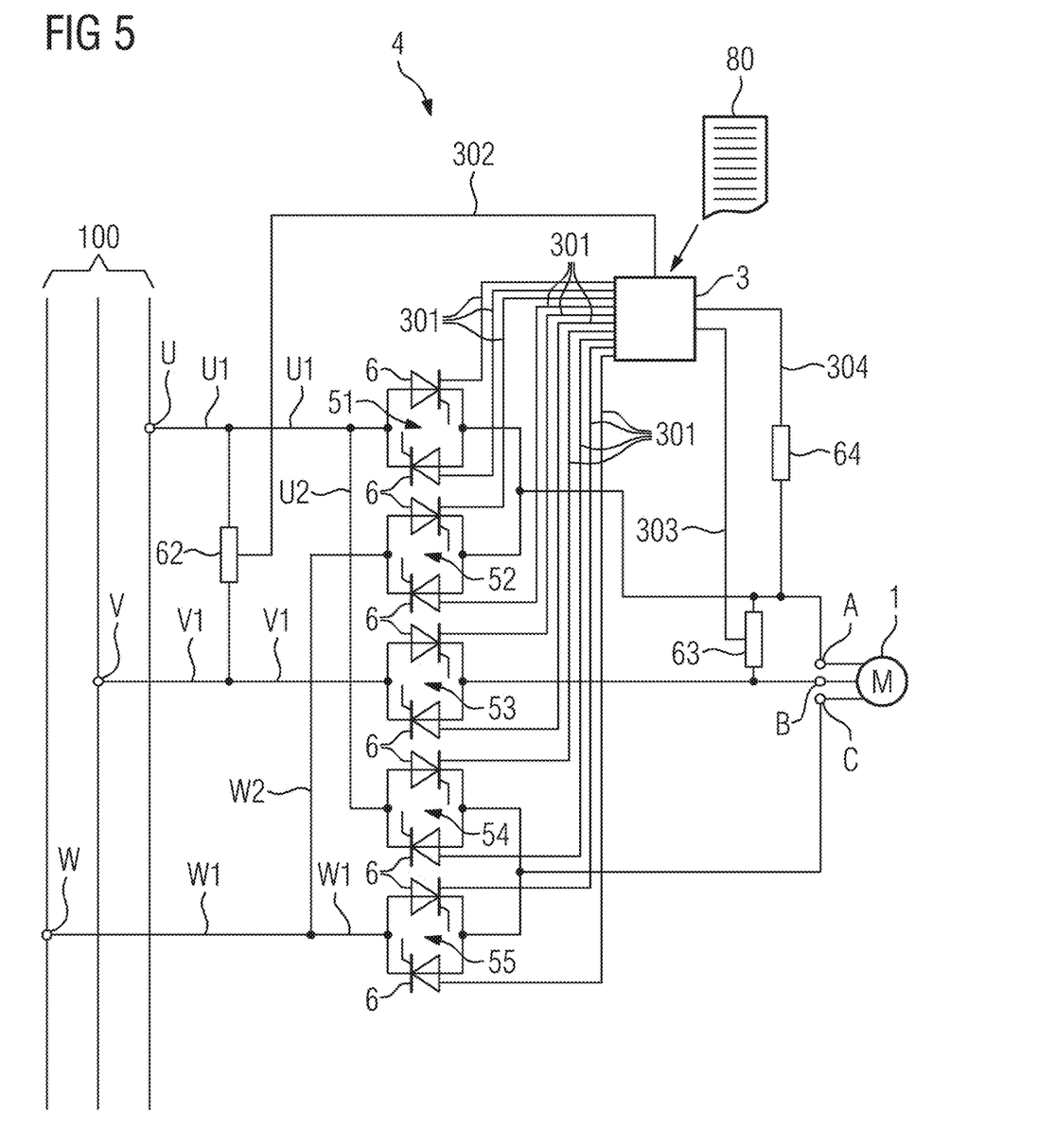
FIG. 5 a soft starter circuit having three switchable phases for generating a co- and counter-rotating rotational field.

FIG. 5 shows a soft starter circuit having three switchable current phases for generating a co- and counter-rotating rotational field. The phase terminals A, B, C of a three-phase synchronous machine 1, in particular a permanent-magnet synchronous machine, are connected to a three-phase controller 4. The three-phase controller 4 is conductively connected via phase terminals U, V, W to the phases of a three-phase network 100. The three-phase synchronous machine 1 comprises a rotor and a stator connected to the three-phase network having a three-phase stator winding having phase connections A, B, C.

In phase lines U1, V1, W1, which respectively connect the phase terminals U, V, W of the three-phase controller 4 to the phase terminals A, B, C of the three-phase synchronous machine 1, in each case a semiconductor module 51, 53, 55 consisting in each case of two anti-parallel connected thyristors 6 is connected. Thus, the stator, via a first semiconductor circuit arrangement 51, 53, 55, is connected to the three-phase network to form a first rotational field rotating in a first direction of rotation in the stator.

In addition, in phase lines U2, W2, which respectively connect the phase terminals U, W of the three-phase controller 4 to the phase terminals C, A of the three-phase synchronous machine 1, in each case a semiconductor module 52, 54 consisting in each case of two anti-parallel connected thyristors 6 is connected. Thus, the stator is connected to the three-phase network via a second semiconductor circuit arrangement 52, 53, 54 for forming a second rotational field rotating in a direction of rotation opposite to the first direction of rotation in the stator.

The ignition electrodes of the thyristors 6 are connected to a control device 3, from which the ignition signals required for igniting the thyristors 6 are provided. The control device 3 is realized by a microcontroller.

On the network side of the semiconductor modules 51, 52, 53, 54, 55, a first voltage measuring device 62, for example, a voltage measuring device in the form of a voltage transducer, is connected between two phases of the three-phase network, for example, between the phase terminals U and V of the three-phase controller 4 in FIG. 5, at the output of which the measured value of the network voltage applied between these two terminals U and V is available. Further, not shown, voltage measuring devices for detecting the network voltage applied between the phase pair U, W and the phase pair V, W can also be present.

Between two phase terminals A, B, C of the three-phase motor 1, for example, between the terminals A and B of the three-phase motor 1 in FIG. 5, on the motor side of the semiconductor modules 51, 52, 53, 54, 55, a second voltage measuring device 63 is connected, at the output of which the measured value of the motor voltage applied between these two terminals A and B, also called terminal voltage, is available. Further, not shown, voltage measuring devices for detecting the motor voltage applied between the terminal pair A, C and the terminal pair B, C, also called terminal voltage, can also be present.

A current measuring device 64, for example, a current measuring device in the form of a current transformer or a current sense resistor, is connected to the phase connection A of the three-phase motor 1 on the motor side of the semiconductor modules 51, 52, 53, 54, 55. The measured value of the stator phase current, also called string current, flowing through this phase terminal A is available at the output of the current measuring device 64. Other current measuring devices, not shown, for detecting the stator phase current flowing through the phase terminals B and C can also be present.

Alternatively, it is also possible for the current measuring device 64 to be arranged on the network side of the semiconductor modules 51, 52, 53, 54, 55, so that the measured value of the current flowing in the phase line U1 is available at the output of the current measuring device 64. Other, not shown, current measuring devices for detecting the current flowing in the phase lines V1 and W1 can also be present.

In one embodiment variant, the control device 3 and the three-phase controller 4 are a unit separate from the three-phase synchronous machine 1, that is, realized as a separate motor control device. In a second embodiment variant, the control device 3 and the three-phase controller 4 are part of the three-phase synchronous machine 1. In this case, the functions of the control device 3 are expediently integrated into an already existing microprocessor in the three-phase synchronous machine 1. In the present example embodiment, the control device 3 serves to process a suitable program with which the device can be operated by software.

Accelerating torque is required to accelerate the synchronous machine 1 from standstill. For this purpose, it is necessary to energize the stator winding such that positive torque (internal torque) is generated, which causes both an acceleration of the machine 1, and also compensates for the counter-torque of the load.

In order to generate stator currents by ignition of the thyristors 6 at a certain time, which provide a favorable torque curve, the stator currents and the torque are calculated for specific parameter configurations. The parameters used are the phase position of the network voltage measured by the first voltage measuring device 62 and transmitted therefrom as a measured value via a measured value line 302 to the control device 3, the phase position, measured by the second voltage measuring device 63 and transmitted therefrom as a measured value via a measured value line 303 to the control device 3, of the motor voltage induced by the rotor, and the stator phase currents measured by the current device 64 and transmitted therefrom as a measured value via a measured value line 304 to the control device 3.

Those ignition times for an ignition of the thyristors 6 which cause a positive torque in the motor 1 are selected from the two oppositely rotating rotational fields in the stator. For this purpose, the control unit 3 sets the semiconductors so that the rotor L is accelerated by current pulses of both the first and the second rotational field in the first direction of rotation. This method can be implemented by a computer program product 80 that is executable in the control unit 3.

Figure 6:
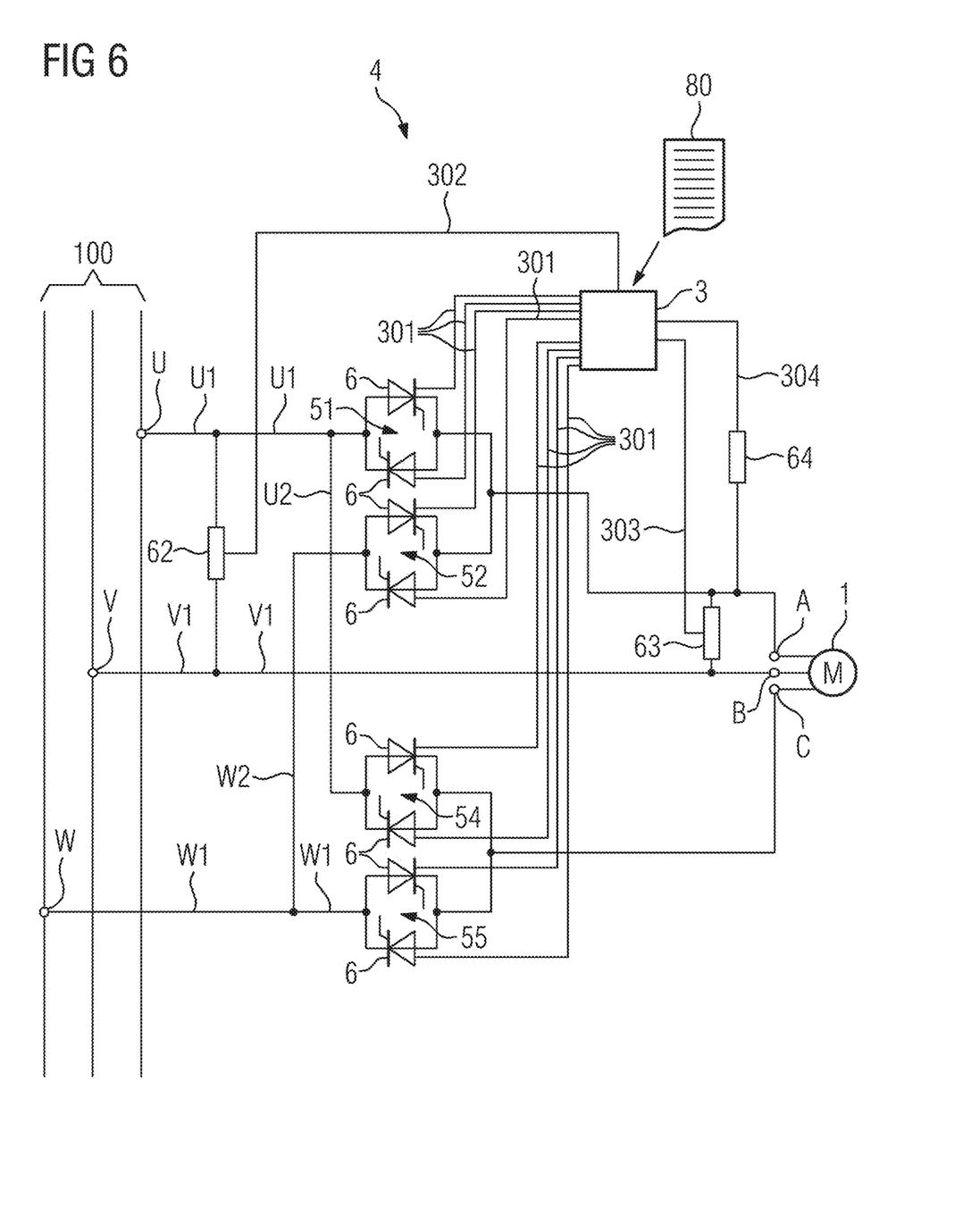
FIG. 6 a soft starter circuit having two switchable phases for generating a co- and counter-rotating rotational field.

FIG. 6 shows a soft starter circuit having two switchable phases for generating a co- and counter-rotating rotational field. The statements made above regarding FIG. 5 apply here analogously, except that the soft starter circuit illustrated in FIG. 6 leaves the middle phase V unconnected, that is, into the phase line V1, which connects the phase V of the three-phase network to the phase connection B of the three-phase synchronous machine 1, no semiconductor module is connected to open or block the phase line V1.

Figure 7:
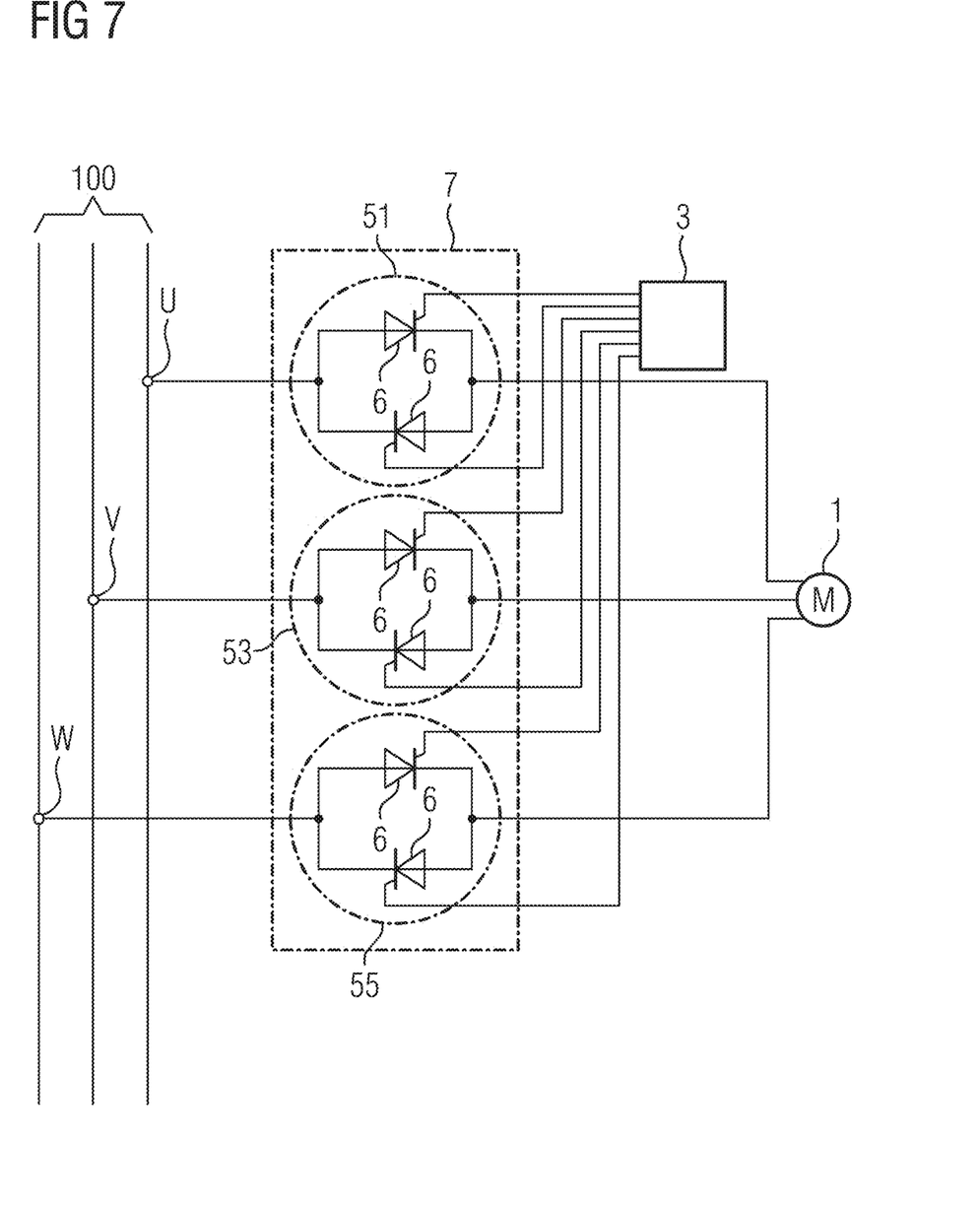
FIG. 7 a conventional soft starter arrangement.

FIG. 7 shows a conventional soft starter arrangement, as it is widely used today for asynchronous machines 1. The 3-phase soft starter arrangement is connected between a three-phase network 100 and a three-phase machine 1. The soft starter arrangement has a semiconductor circuit arrangement 7 having semiconductor modules 51, 53, 55, which each have two anti-parallel connected thyristors 6. The soft starter arrangement is electrically connected to the three phases of the three-phase network 100 via three phase connections U, V, W. The three phases of the three-phase network 100 are electrically connectable to the terminals of a three-phase machine by corresponding phase lines of the soft starter arrangement, wherein the said phase lines can each be connected by a semiconductor module 51, 53, 55 which can assume a conductive or a blocking state. For this purpose, ignition electrodes of the thyristors 6 are connected to a control device 3, from which the ignition signals required for igniting the thyristors 6 are provided. A suitable driving of the semiconductor modules 51, 53, 55 (conducting or blocking) electrically connects the phases of the three-phase network 100 to the stator windings of the three-phase machine 1 in such a timed manner that the desired operation of the three-phase machine 1 is achieved.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for operating a three-phase machine including a rotor and a stator, connected to a three-phase network including a three-phase stator winding, the stator being connected to the three-phase network via a first semiconductor circuit arrangement for forming a first rotational field rotating in a first direction of rotation in the stator and via a second semiconductor circuit arrangement for forming a second rotational field rotating in a direction of rotation opposite to the first direction of rotation in the stator, the three-phase machine further including a controller for setting the semiconductors of the first semiconductor circuit arrangement and semiconductors of the second semiconductor circuit arrangement, the method comprising:

controlling, via the controller, the semiconductors of the first semiconductor circuit arrangement and the semiconductors of the second semiconductor circuit arrangement to accelerate the rotor by current pulses of both the first rotational field and the second rotational field in the first direction of rotation, the second rotating field providing additional times for setting the semiconductors of the second semiconductor circuit arrangement, in which the rotor is acceleratable in the first direction of rotation.

2. The method of claim 1, wherein only two phases of the three-phase network are settable by the first semiconductor circuit arrangement and second semiconductor circuit arrangement.

3. A non-transitory computer readable medium storing a computer program that, when executed by a processor, is configured to perform the method of claim 2.

4. The method of claim 1, wherein the three-phase machine is a permanent-magnet synchronous machine.

5. The method of claim 4, wherein the three-phase machine is a permanent-magnet synchronous machine including a damper cage.

6. A non-transitory computer readable medium storing a computer program that, when executed by a processor, is configured to perform the method of claim 5.

7. A non-transitory computer readable medium storing a computer program that, when executed by a processor, is configured to perform the method of claim 4.

8. A non-transitory computer program product, executable in a controller, the non-transitory computer program product storing a program that, when executed by the controller, is configured to perform the method of claim 1.

9. A non-transitory computer readable medium storing a computer program that, when executed by a processor, is configured to perform the method of claim 1.

10. A three-phase controller for operating a three-phase machine including a rotor and a stator, comprising:

three contacts for respective connection to three respective phases of a three-phase network;
three contacts for connection to stator windings of the three-phase machine;
a first semiconductor circuit arrangement for forming a first rotational field rotating in a first direction of rotation in the stator of the three-phase machine;
a second semiconductor circuit arrangement for forming a second rotational field rotating in a direction of rotation opposite to the first direction of rotation in the stator of the three-phase machine; and
a controller for controlling the first semiconductor circuit arrangement and the second semiconductor circuit arrangement, to accelerate the rotor of the three-phase machine by current pulses of both the first rotational field and the second rotational field in the first direction of rotation, the second rotating field providing additional times for setting semiconductors of the second semiconductor circuit arrangement, in which the rotor is acceleratable in the first direction of rotation.

11. The three-phase controller of claim 10, wherein the controller is a microprocessor.

12. A drive system, comprising
the three-phase machine, including the stator having the stator winding and the rotor;
at least one first voltage measuring device for detecting at least two voltages of a three-phase network provided for driving the three-phase machine;
at least one second voltage measuring device for detecting at least two terminal voltages of the three-phase machine; and
at least one current measuring device for detecting at least two stator phase currents of the three-phase machine; and
the three-phase controller of claim 11.

13. A drive system, comprising
the three-phase machine, including the stator having the stator winding and the rotor;
at least one first voltage measuring device for detecting at least two network voltages of a three-phase network provided for driving the three-phase machine;
at least one second voltage measuring device for detecting at least two terminal voltages of the three-phase machine; and
at least one current measuring device for detecting at least two stator phase currents of the three-phase machine; and
the three-phase controller of claim 10.

14. The three-phase controller of claim 10, wherein the three-phase controller is for operating a permanent-magnet synchronous machine.

* * * * *